(12) United States Patent
Okamoto et al.

(10) Patent No.: US 9,742,343 B2
(45) Date of Patent: Aug. 22, 2017

(54) ELECTRIC PUMP

(71) Applicant: TBK Co., Ltd., Machida-shi, Tokyo (JP)

(72) Inventors: Kazuaki Okamoto, Kawasaki (JP); Hirotada Yoshitani, Yamato (JP)

(73) Assignee: TBK CO., LTD., Machida-shi (JP)

( * ) Notice: Subject to any disclaimer, the term of this patent is extended or adjusted under 35 U.S.C. 154(b) by 0 days.

(21) Appl. No.: 15/026,887

(22) PCT Filed: Oct. 4, 2013

(86) PCT No.: PCT/JP2013/005934
§ 371 (c)(1),
(2) Date: Apr. 1, 2016

(87) PCT Pub. No.: WO2015/049713
PCT Pub. Date: Apr. 9, 2015

(65) Prior Publication Data
US 2016/0233814 A1 Aug. 11, 2016

(51) Int. Cl.
*H02P 29/00* (2016.01)
*H02P 6/00* (2016.01)
(Continued)

(52) U.S. Cl.
CPC ............ *H02P 29/005* (2013.01); *F04B 15/02* (2013.01); *F04B 17/03* (2013.01); *F04B 49/065* (2013.01);
(Continued)

(58) Field of Classification Search
CPC .................................................. H02P 29/005
(Continued)

(56) References Cited

U.S. PATENT DOCUMENTS 7,451,753 B2 * 11/2008 Bell ................... F02C 7/224
123/196 R
8,038,412 B2 * 10/2011 Durtschi .............. F04B 49/00
417/14
(Continued)

FOREIGN PATENT DOCUMENTS

JP 3-88980 A 4/1991
JP 2001-280284 A 10/2001
(Continued)

OTHER PUBLICATIONS

International Search Report dated Dec. 17, 2013, issued in counterpart International Application No. PCT/JP2013/005934 (2 pages).
(Continued)

*Primary Examiner* — David S Luo
(74) *Attorney, Agent, or Firm* — Westerman, Hattori, Daniels & Adrian, LLP (57) ABSTRACT

An electric oil pump constructed by integrally combining an electric motor with an oil pump, wherein the electric motor is composed of a motor casing, a drive shaft that is disposed in a motor housing chamber formed inside the motor casing and is rotatably supported, a rotor that is disposed on the drive shaft, and a stator that is located inside the motor housing chamber and is attached to the motor casing. The electric oil pump is equipped with an internal controller that controls application of electric power to the stator so as to cause the drive shaft to be driven to rotate via the rotor.

3 Claims, 7 Drawing Sheets (51) Int. Cl.
- *F04B 15/02* (2006.01)
- *F04B 17/03* (2006.01)
- *F04B 49/06* (2006.01)
- *F04B 53/08* (2006.01)
- *F04C 13/00* (2006.01)
- *F04D 13/06* (2006.01)
- *F04D 29/58* (2006.01)
- *F04C 2/18* (2006.01)
- *F04C 15/00* (2006.01)
- *H02P 29/62* (2016.01)

(52) U.S. Cl.
CPC ............... *F04B 53/08* (2013.01); *F04C 2/18* (2013.01); *F04C 13/001* (2013.01); *F04C 13/004* (2013.01); *F04C 15/008* (2013.01); *F04C 15/0096* (2013.01); *F04D 13/0606* (2013.01); *F04D 29/588* (2013.01); *H02P 6/00* (2013.01); *H02P 29/62* (2016.02); *F04C 2210/44* (2013.01); *F04C 2270/19* (2013.01); *F04C 2270/46* (2013.01); *F04C 2270/86* (2013.01)

(58) Field of Classification Search
USPC .......................................... 318/473, 471, 445
See application file for complete search history.

(56) References Cited

U.S. PATENT DOCUMENTS

| | | |
|---|---|---|
| 2005/0262858 A1* | 12/2005 | Inaba ................ B60H 1/00878 62/190 |
| 2007/0246302 A1 | 10/2007 | Bell et al. |
| 2010/0278660 A1 | 11/2010 | Burchill et al. |
| 2011/0070100 A1 | 3/2011 | McSweeney et al. |

FOREIGN PATENT DOCUMENTS

| | | |
|---|---|---|
| JP | 2004-183595 A | 7/2004 |
| JP | 2005-94818 A | 4/2005 |
| JP | 2005-326054 A | 11/2005 |
| JP | 2012-87656 A | 5/2012 |

OTHER PUBLICATIONS

Office Action and Search Report dated Feb. 28, 2017, issued in counterpart Chinese Patent Application No. 201380080054.7, with English translation. (14 pages).

Extended Search Reported dated Apr. 26, 2017, issued in counterpart European Application No. 13895031.6 (7 pages).

* cited by examiner

FIG.7

ELECTRIC PUMP

TECHNICAL FIELD

The present invention relates to an electric pump in which a liquid pump and an electric motor of a type in which the rotor and stator are rotatably driven without contact are integrally combined.

TECHNICAL BACKGROUND

An example of such an electric pump is described in Patent Document 1. This electric pump comprises a rotor 5 accommodated in a can (partition member) 2, and a stator core 8 and a stator coil 9 (stator) arranged outside the can 2. The can 2 is provided so that a liquid drawn in by and discharged from the liquid pump does not penetrate into the electric motor through any gap between a drive shaft and case. This electric pump is referred to as a canned pump.

PRIOR ARTS LIST

Patent Document

Patent Document 1: Japanese Laid-open Patent Publication No. 2001-280284 (A)

SUMMARY OF THE INVENTION

Problems to be Solved by the Invention

For example, a permanent magnet is provided to the rotor of the electric pump, and the rotor thereby rotates under electromagnetic force from the stator coil. However, there is a problem in that the rotor is wetted by liquid that has leaked into the can; therefore, the liquid viscosity increases when the liquid temperature is low, and when liquid-viscosity-induced drive resistance exceeds the rotational drive force of the rotor, it may be more difficult to rotatably drive the rotor in accordance with control for applying electric power to the stator coil. In an example of a conceivable method involves separately providing a heater for heating the liquid to the electric pump, but fresh problems are presented in that the size of the electric pump is increased to accommodate the heater, or manufacturing costs are increased.

The present invention was developed in view of the problems described above, it being an object of the present invention to provide electric pump capable of driving even when the liquid temperature is low and the liquid viscosity is high, without any increase in the size of the apparatus overall and without an increase in manufacturing costs.

Means to Solve the Problems

The electric pump (e.g., the electric oil pump 1 in the embodiment) of the present invention comprises an integral combination of a brushless electric motor and a liquid pump (e.g., the oil pump 3 in the embodiment) rotatably driven by the electric motor, the electric pump characterized in that the electric motor comprises a motor case (e.g., the motor casing 10 in the embodiment), a motor drive shaft (e.g., the drive shaft 42 in the embodiment) that is arranged in a case internal space (e.g., the motor housing chamber 12 in the embodiment) formed inside the motor case and that is rotatably supported by the motor case, a rotor disposed on the motor drive shaft, and a stator that is positioned inside the case internal space so as to surround and oppose the rotor from the outward circumferential direction and that is mounted on the motor case, electric power application control means (e.g., the internal controller 45 in the embodiment) is provided for controlling application of electric power to the stator and performing control for rotatably driving the motor drive shaft via the rotor, the electric power application control means is provided with: a normal control mode (e.g., the normal mode U in the embodiment) for controlling application of electric power to the stator such that the motor drive shaft rotates in accordance with an externally inputted rotation command; and a heat generation control mode (e.g., the heat generation mode H in the embodiment) for controlling application of electric power to the stator such that the stator generates heat at a higher heating efficiency than the heating efficiency of the stator when the application of electric power is controlled in the normal mode.

In the above-described electric pump, preferably, the rotor is provided with a permanent magnet on a surface opposing the stator, the stator is provided with a stator coil, the electric power application control means is configured so as to control application of electric power to the stator coil, and the heat generation control mode is a mode for controlling the application of electric power to the stator coil so that substantially the lowest voltage frequency f among the voltage frequencies f satisfying the formula $$f > \sqrt{\frac{\frac{2V_{RMS}^2}{I_{Max}^2} - R^2}{2\pi L}}$$

is assumed, where R is the resistance of the stator coil, L is the inductance of the stator coil, f is the frequency of the voltage applied to the stator coil, $V_{RMS}$ is the root-mean-square value of the voltage applied to the stator coil, and $I_{MAX}$ is the maximum current that can flow to the stator coil.

Preferably a temperature detector for detecting the temperature of a liquid fed from the liquid pump by the liquid pump being rotatably driven is provided and the electric power application control means controls application of electric power to the stator using the heat generation control mode when the temperature of the liquid detected by the temperature detector is lower than a predetermined temperature (e.g., the reference temperature $T_L$ in the embodiment).

Preferably, a rotational speed detector (e.g., the rotational position detector 44 in the embodiment) for detecting the rotational speed of the electric motor is provided, the electric power application control means is furthermore provided with a startup control mode (e.g., startup mode K in the embodiment) for performing control that applies power to the stator in a predetermined power application pattern, and causing the rotor to be placed in a state of rotation that allows power application control using the normal control mode, and the electric power application control means controls the application of power to the stator using the heat generation control mode when the rotational speed of the rotor as detected by the rotational speed detector is less than a predetermined rotational speed (e.g., reference rotational speed $R_0$ in the embodiment) when power application control has been performed using the startup control mode.

Preferably, the electric motor is provided with a partitioning member (e.g., partitioning case 30 in the embodiment) that extends through the area in which the rotor and the stator oppose each other, and partitions the case internal space into a rotor-side space in which the motor drive shaft and the rotor are disposed and a stator-side space in which the stator is disposed.

Advantageous Effects of the Invention

In the electric pump of the present invention, electric power application control means for controlling the application of electric power to the stator is provided with a normal control mode for controlling application of electric power to the stator so as to obtain rotation that corresponds to a rotation command; and a heat generation control mode for causing the stator to generate heat at a higher heating efficiency than the heating efficiency of the stator when the application of electric power is controlled in the normal mode. For this reason, controlling the application of electric power using the heat generation mode when the liquid temperature is low and liquid viscosity-induced drive resistance is higher than the rotational force of the rotor makes it possible to heat the liquid inside the electric motor and reduce viscosity (liquid viscosity-induced drive resistance) using heat efficiently generated by the stator. Consequently, the electric pump can be driven even when the liquid temperature is low and liquid viscosity is high, without adding a heater or the like and increasing the size of the apparatus overall or increasing manufacturing costs.

DESCRIPTION OF THE EMBODIMENTS

Figure 1:
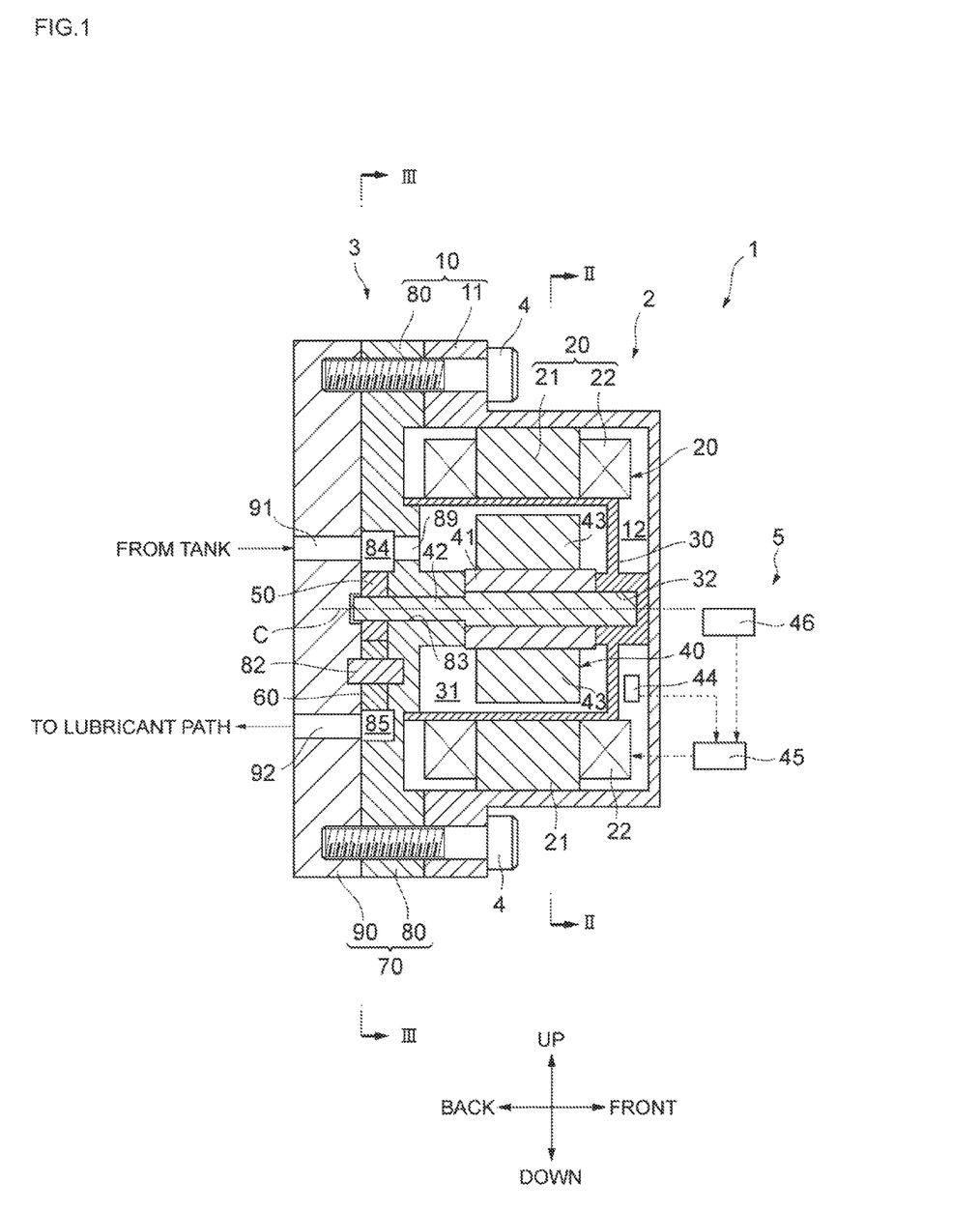
FIG. 1 is a cross-sectional view of an electric oil pump in which the present invention has been applied.

An embodiment of the present invention will be described with reference to the drawings. FIG. 1 shows a cross section of an electric oil pump 1 as an example in which the present invention has been applied, and the overall configuration of the electric oil pump 1 will first be described with reference to FIG. 1. In the embodiment described below, front and rear, left and right (although an arrow is not shown in FIG. 1, the direction perpendicular to the plane of the drawing), and up and down are defined and described using arrows appended to the drawings for the sake of brevity. The example shown in the present embodiment is that of an electric oil pump 1 that draws in lubricant stored in a tank (e.g., engine oil pan) provided to a vehicle, and discharges the lubricant to a lubricant path connected to parts of an engine.

The electric oil pump 1 is provided with an AC electric motor 2 for outputting rotational drive force, an oil pump 3 that is driven by the electric motor 2 and that discharges drawn-in lubricant to a lubricant path, and a drive control device 5 for drivably controlling the electric motor 2.

The electric motor 2 is provided with a motor casing 10 having a substantially cylindrical motor housing chamber 12 in which the center axis extends in the longitudinal direction, a stator 20 arranged along the internal peripheral surface of the motor casing 10 inside the motor housing chamber 12, a partitioning case 30 that has a substantially bottomed cylindrical rotor housing chamber 31 and that is arranged at the internal periphery of the stator 20, and a rotor 40 rotatably arrange inside the rotor housing chamber 31 of the partitioning case 30.

The motor casing 10 comprises a main motor case 11 in which a bottomed cylindrical space that is open rearward has been formed, and a sub-motor case 80 assembled to the rear part of the main motor case 11 so as to cover the bottomed cylindrical space. The motor housing chamber 12 is formed by the bottomed cylindrical space of the main motor case 11 thus covered by the sub-motor case 80. The sub-motor case 80 has a pump cover 90 (described later) assembled on the rear part, and constitutes a pump casing 70 having a gear placement chamber 81. It is thus apparent that the sub-motor case 80 serves a dual purpose as the motor casing 10 and the pump casing 70.

The main motor case 11 is formed using a nonmagnetic material, so that it is possible to minimize any effect on the magnetic force generated by the stator 20 and/or the rotor 40.

Figure 2:
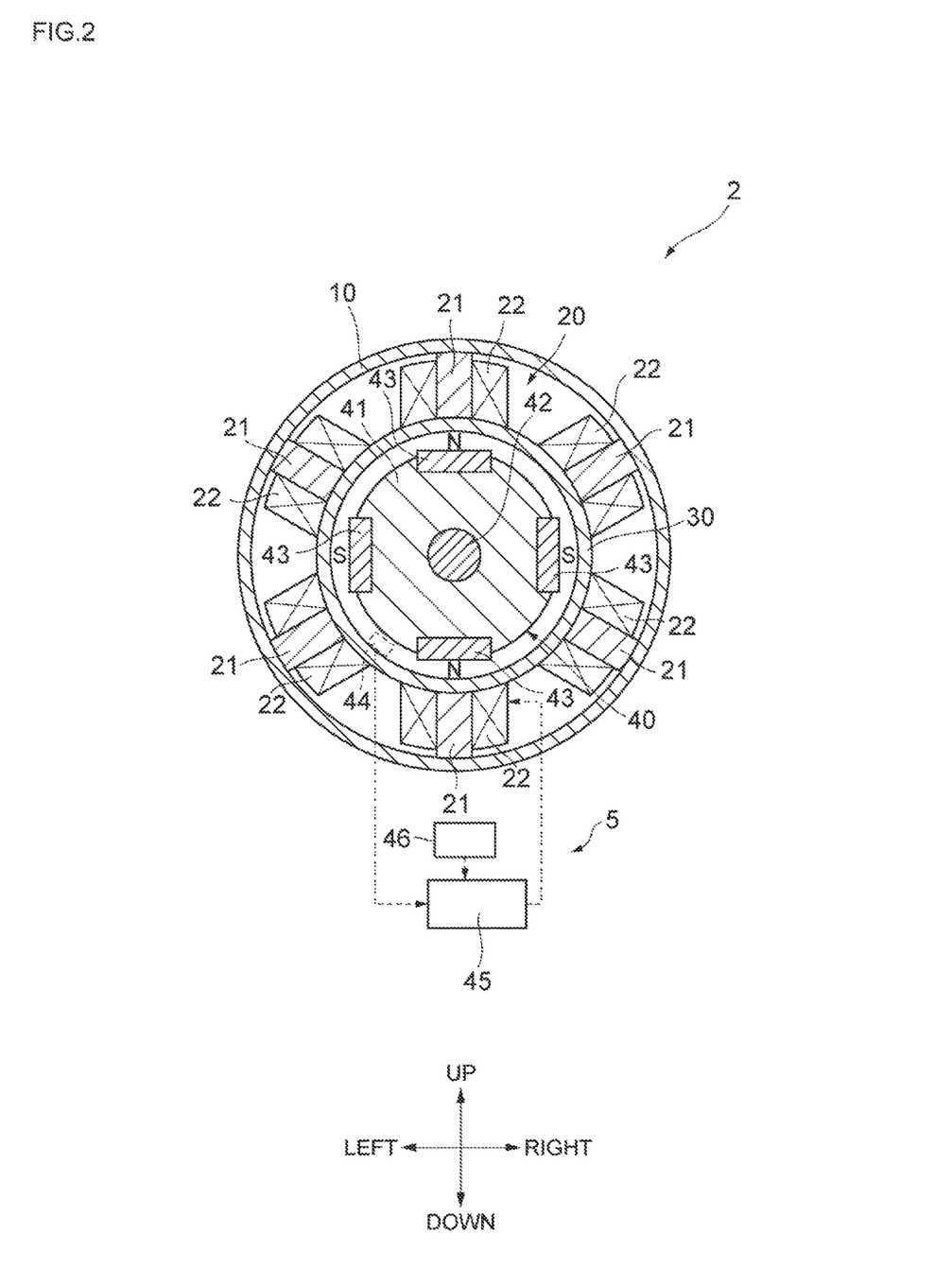
FIG. 2 is a cross-sectional view of an electric motor used in the electric oil pump of FIG. 1 along line II-II.

FIG. 2 shows a cross section of the portion along the line II-II in FIG. 1. It is apparent from FIG. 2 that the stator 20 is joinably mounted on the internal peripheral surface of the main motor case 11, and is provided with a plurality of stator cores 21 that are substantially ovoid as viewed in cross section and that extend radially inward, and a stator coil 22 provided so as to surround the stator core 21. Six stator cores 21 are arranged equidistantly along the peripheral direction on the internal peripheral surface of the main motor case 11, and the stator coils 22 are provided to each of the stator cores 21. The stator core 21 may be substantially rectangular as viewed in cross section or substantially circular as viewed in cross section extending inward in the radial direction, and may be integrally formed with the main motor case 11.

The partitioning case 30 has a bottomed cylindrical shape that is open in the rear part, and has a cylindrical front-side shaft support section 32 in the front center (bottom center). The partitioning case 30 is formed using a nonmagnetic material, and has a configuration that minimizes the effect on the magnetic force generated by the stator 20 and/or the rotor 40, i.e., a configuration that does not interfere with the transmission of magnetic force from the stator 20 to the rotor 40. A drive shaft 42 (described later) is rotatably supported by the front-side shaft support section 32 formed in the bottom center of the partitioning case 30. The partitioning case 30 is mounted on the sub-motor case 80 by the rear end section thereof being joiningly fitted to a ring-shaped convexity formed on the front surface of the sub-motor case 80, and the rotor housing chamber 31 composed of the space on the inner peripheral side of the partitioning case 30 is partitioned from outside space in a liquid-tight state. In other words, the motor housing chamber 12 is partitioned by the partitioning case 30, and the outer peripheral side space (referred to as stator-side space) and the inner peripheral side space (the rotor housing chamber 31, but may also be referred to as rotor-side space) are dividably formed in a liquid-tight state.

The rotor 40 is composed of a cylindrically formed rotor core 41 disposed so that the center axis extends in the longitudinal direction, and a plurality of permanent magnets 43 formed in the shape of a substantially rectangular plate and mounted on the external peripheral part of the rotor core 41. The drive shaft 42 is insertably mounted in the rotor 40 longitudinally in the center part of the rotor core 41. As shown in FIG. 2, four permanent magnets 43 are mounted so as to be equidistantly arranged along the peripheral direction of the rotor core 41. The permanent magnets 43 are disposed so that the magnetic pole (S pole or N pole) of the external surface in the radial direction is different from that of the adjacent permanent magnet 43. The rotor 40 is configured so that the front part of the drive shaft 42 is rotatably supported by the front-side shaft support section 32 and the rear part is rotatably supported by a later-described rear-side shaft support section 83 of the sub-motor case 80, and the rotor core 41, the drive shaft 42, and the permanent magnets 43 are configured to rotate in integral fashion about an axis of rotation C.

As shown in FIG. 1, the drive control device 5 is provided with a rotational position detector 44 disposed between the bottom of the main motor case 11 and the bottom of the partitioning case 30, an internal controller 45 disposed on the front side f the bottom of the main motor case 11, and a temperature detector 46 disposed on the front side of the bottom of the main motor case 11 in similar fashion to the internal controller 45. The rotational position detector 44 is configured using, e.g., a Hall element; the rotational position detector 44 detecting the magnetic pole and magnetic field strength of the rotor 40 (permanent magnet 43), and outputting a detection signal corresponding to the detection results to the internal controller 45. The temperature detector 46 detects the temperature of the electric motor 2 (main motor case 11), and outputs a detection signal corresponding to the detection results to the internal controller 45.

Figure 4:
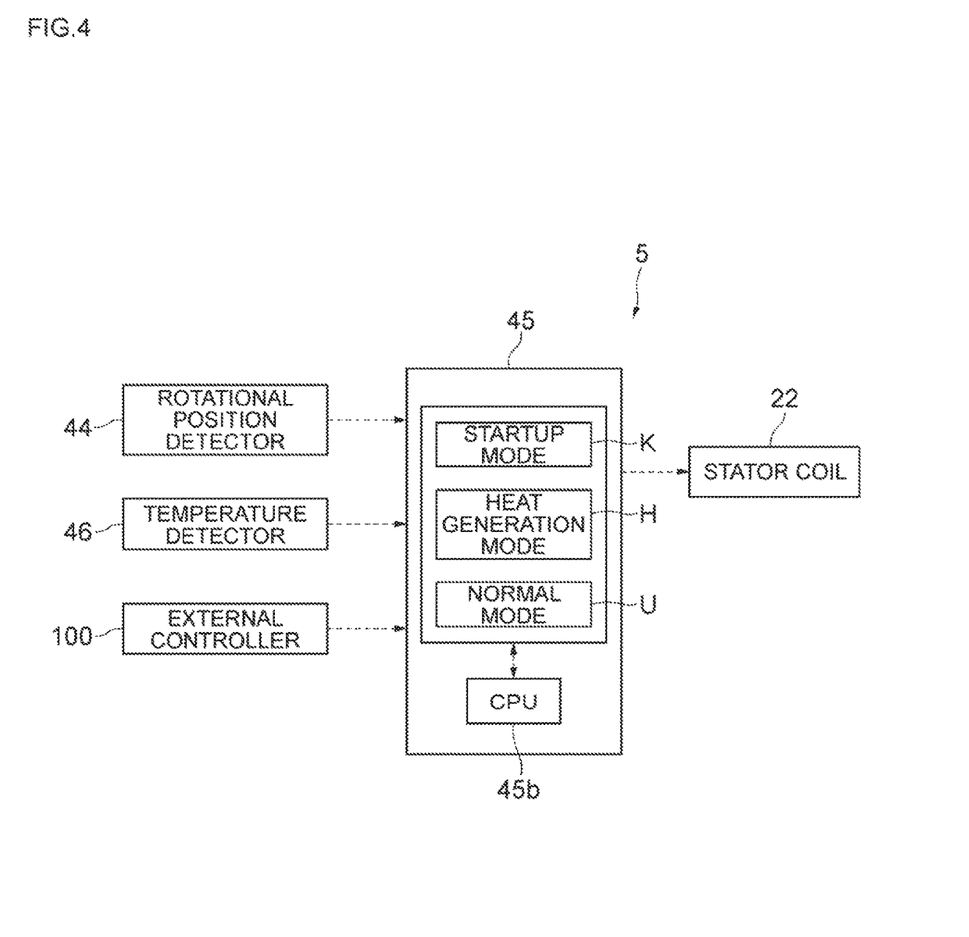
FIG. 4 is a block view of the configuration of the drive control device.

As shown in FIG. 4, the internal controller 45 is provided with a memory 45a for storing program information related to drive control of the electric motor 2, and a CPU 45b for reading and executing program information stored in the memory 45a. Stored in the memory 45a are program information related to a startup mode K read and executed by the CPU 45b when the electric motor 2 is started up, program information related to a normal mode U read and executed by the CPU 45b after startup, as well as other information. The CPU 45b reads from the memory 45a program information corresponding to detection signals sent from the rotational position detector 44 and the temperature detector 46, executes the read-out program information (program) on the basis of the detection signals, and controls application of electric power to the stator coil 22 on the basis of the execution results to drivably control the electric motor 2.

An external controller 100 for controlling the overall operation of the engine, electric oil pump 1, and the like is provided to the vehicle in which the electric oil pump 1 is installed, and a rotation signal as a rotation request to the electric oil pump 1 is outputted from the external controller 100 to the internal controller 45. The electric motor 2 is also referred to as a synchronous motor, or an inner rotor-type brushless motor.

Figure 3:
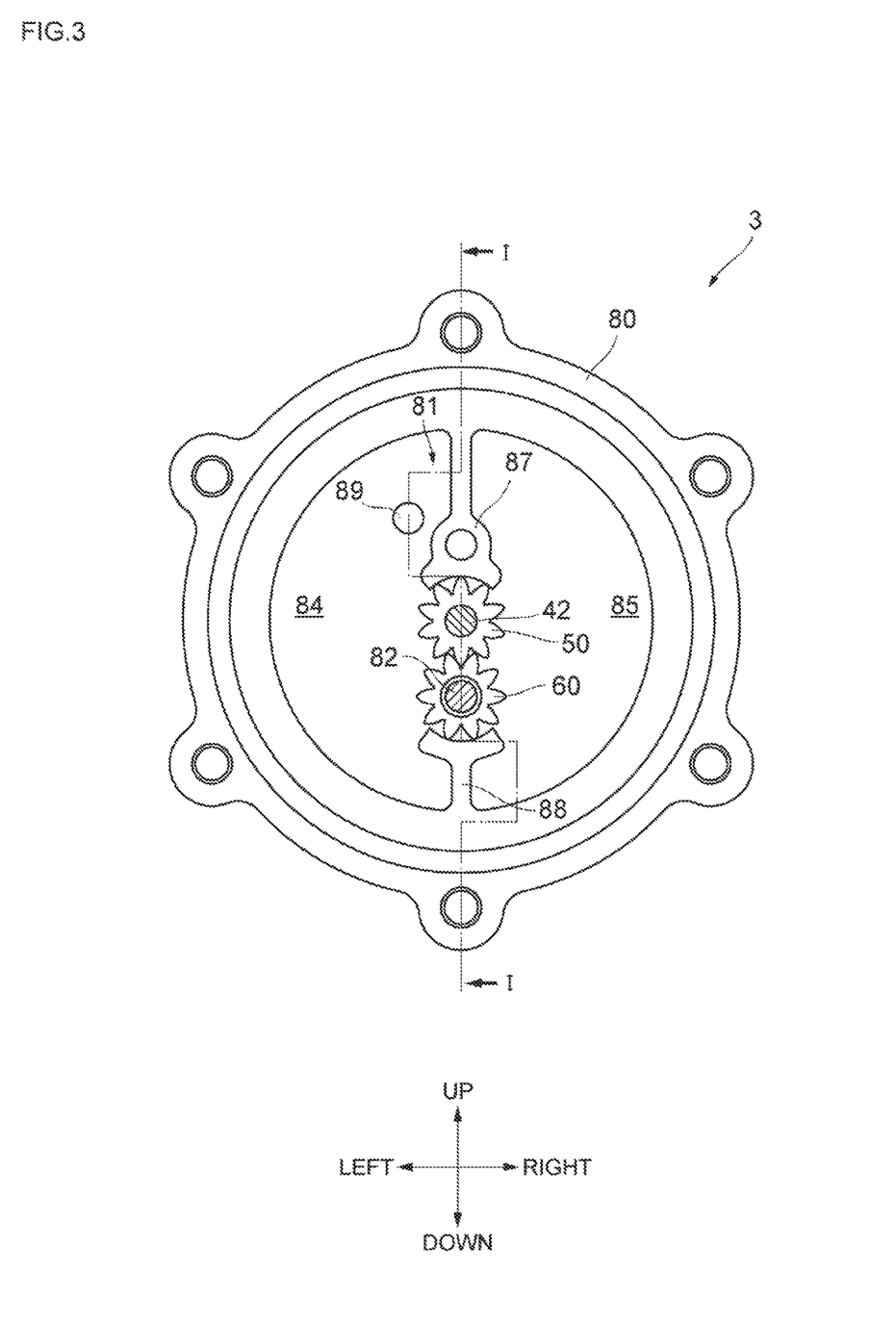
FIG. 3 is a cross-sectional view of the oil pump used in the electric oil pump in FIG. 1 along line III-III.

The oil pump 3 is an externally meshing gear pump composed of: a drive gear 50 and a driven gear 60 that externally mesh and that are rotatably provided about mutually parallel rotational axes; and a pump casing 70 for housing and holding the drive gear 50 and the driven gear 60. The pump casing 70 is composed of the above-described sub-motor case 80, and a pump cover 90 join ably mounted on the rear surface thereof. A gear placement chamber 81 in which the gears 50, 60 are housed and held in a state that allows sliding contact with the tooth tips and front and rear side surfaces is formed in the sub-motor case 80 and is open in the rear. The pump cover 90 is threadably fastened and mounted on the sub-motor case 80 (electric motor 2) using a set bolt 4 such that the gear placement chamber 81 is blocked off.

The drive gear 50 is connected to and supported on the rear end part of the drive shaft 42 constituting the above-described rotor 40, and integrally rotates with the drive shaft 42 in accompaniment with the rotation of the rotor 40. The driven gear 60 is connected to and supported on a driven shaft 82 disposed so as to extend parallel to the drive shaft 42, and is driven and rotated integrally with the driven shaft 82 in accordance with the rotation of the drive gear 50.

Formed on the sub-motor case 80 are a drive-side partitioning part 87 having an arcuate drive-side partitioning surface as viewed front above that allows the tooth tips of the drive gear 50 to slide, and a driven-side partitioning part 88 having an arcuate driven-side partitioning surface that allows the tooth tips of the driven gear 60 to slide, as shown in FIG. 3. The gear placement chamber 81 formed inside the pump casing 70 is divided by the gears 50, 60, and the drive-side partitioning part 87 and driven-side partitioning part 88, and the left side of the gears 50, 60 and the right side of an intake chamber 84 form a discharge chamber 85. Formed in the pump cover 90 are an intake port 91 that is in communication with the intake chamber 84 while mounted on the sub-motor case 80, and a discharge port 92 that is in communication with the discharge chamber 85. A communication hole 89 (see FIGS. 1 and 3) that allows the intake chamber 84 to be in communication with the rotor housing chamber 31 is furthermore formed in the sub-motor case 80. The cross section along the portion I-I in FIG. 3 is shown in FIG. 1.

When the gears 50, 60 are rotated in the oil pump 3 thusly configured, lubricant is drawn from the tank into the intake chamber 84 via the intake port 91 by negative pressure acting on the intake chamber 84. Lubricant that has thus been drawn into the intake chamber 84 enters into the tooth space of the gears 50, 60, is transferred in this state to the discharge chamber 85 by the rotational movement of the gears 50, 60, and thereafter discharged from the discharge chamber 85 to the lubricant path via the discharge port 92.

The overall configuration of the electric oil pump 1 has been described above. The lubricant being a supply medium has higher viscosity as the temperature thereof is reduced, and in the particular case that the electric oil pump 1 is used in a low-temperature environment, the drive resistance produced by the viscosity of the lubricant becomes greater than the drive force of the electric motor 2, and it becomes difficult to rotatably drive the oil pump 3 in accordance with the drive control of the electric motor 2. For this reason, in the electric oil pump 1 of the present invention, program information related to the heat generation mode H for controlling the application of electric power to efficiently heat the stator coil 22 is stored in the memory 45a of the internal controller 45 in addition to the startup mode K and the normal mode U described above (see FIG. 4). Also stored in the memory 45a of the internal controller 45 is information such as the reference temperature $T_L$ for determining whether the rotatable driving of the oil pump 3 has been compromised by the viscosity of the lubricant, and a reference rotational speed $R_0$ for determining whether the electric motor 2 is in a startup state.

The reference temperature $T_L$ and reference rotational speed $R_0$ will be described next. The reference temperature $T_L$ is the temperature at which the oil pump 3 can be rotatably driven in accordance with the drive control of the electric motor 2 as long as the lubricant is at or greater the reference temperature $T_L$, and is moreover the temperature at which the oil pump 3 is difficult to be rotatably driven in accordance with the drive control of the electric motor 2 when the lubricant is less than the reference temperature $T_L$. The reference rotational speed $R_0$ is the rotational speed of the rotor 40 in a state of rotation in which control of electric power application in the normal mode U is possible.

Next, the drive control of the electric oil pump 1 carried out by the drive control device 5 will be described with reference to the flowchart shown in FIG. 5. Described first is the case in which the electric oil pump 1 is used in a state in which the viscosity of the lubricant is low and the rotatable driving of the oil pump 3 is not compromised, i.e., the temperature of the main motor case 11 (lubricant) is higher than the reference temperature $T_L$.

Figure 5:
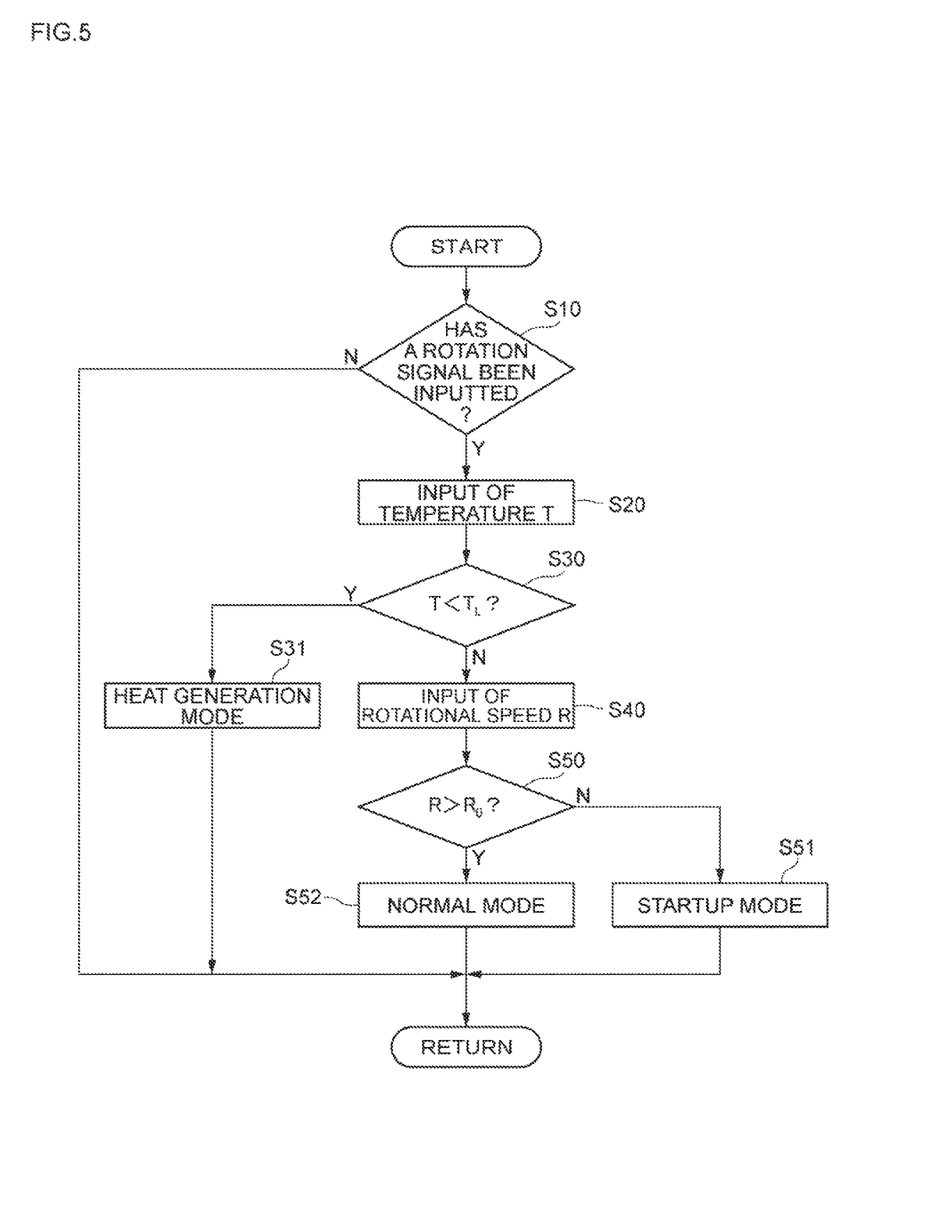
FIG. 5 is a flowchart showing the drive control carried out by the drive control device.

In step S10 shown in FIG. 5, the internal controller 45 determines whether a rotation signal has been inputted from the external controller 100. The flow ends when there is no rotation request directed to the electric oil pump 1 and there is no rotation signal input. Conversely, the process proceeds to step S20 when a rotation signal corresponding to a rotation request has been inputted. After proceeding to step S20, the internal controller 45 receives input of the detection results (detection results corresponding to the temperature of the main motor case 11) sent from the temperature detector 46, calculates the temperature (detection temperature T) of the main motor case 11, and stores the result. The process then proceeds to step S30.

In step S30, it is determined whether the electric motor 2 can be rotatably driven without incident in accordance with control for application of electric power on the basis of the detection temperature T, the CPU 45b reads the reference temperature $T_L$ stored in the memory 45a, and compares the detection temperature T (temperature of the main motor case 11) stored in step S20 with the reference temperature. In this case, since the temperature of the main motor case 11 is higher than the reference temperature $T_L$, it is determined in step S30 that the detection temperature T is greater than the reference temperature $T_L$, and the process proceeds to step S40.

After the process has proceeded to step S40, the internal controller 45 receives input of the detection results sent from the rotational position detector 44, calculates the rotational speed R of the rotor 40, and stores the result. The process then proceeds to step S50. In step S50, the internal controller 45 reads the reference rotational speed $R_0$ stored in the memory 45a, and compares the rotational speed R of the rotor 40 stored in step S40 with the reference rotational speed. As a result, when it is concluded that the rotational speed R is less than the reference rotational speed $R_0$, i.e., that the rotational speed R of the rotor 40 is less than the reference rotational speed $R_0$ and the electric motor 2 has not started up or is starting up, the process proceeds to step S51 before rotational control (normal mode) corresponding to the rotation signal is executed, and control (control in startup mode K) for starting up the electric motor 2 is carried out.

After the process has proceeded to step S51, the CPU 45b reads the startup mode K stored in the memory 45a, and controls the application of electric power to the stator coil 22 using open control, i.e., controls the application of electric power to the stator coil 22 without feedback of the detection signal sent from the rotational position detector 44. Specifically, the entire set of six stator coils 22 shown in FIG. 2 is divided into three sets with opposing stator coils 22 forming a set with each other. The application of electric power is controlled using open control in sequence for each set in the direction of intended rotation of the rotor 40. Under this control for application of electric power, the rotor 40 receives rotational force and is drawn around in the direction in which the electromagnetic force from the stator coil 22 operates. At this point, the temperature of the main motor case 11, i.e., the temperature of the lubricant is higher than the reference temperature $T_L$, and the rotor 40 gradually begins to be drawn around under this rotational force. In a state in which the rotational speed R of the rotor 40 being drawn around is less than the reference rotational speed $R_0$, the process proceeds from step S50 to step S51, and control in the startup mode K is repeatedly executed. The rotation of the rotor 40 when being drawn around in this manner is detected by the rotational position detector 44, and the internal controller 45 detects the rotational speed of the rotor 40 on the basis of the detection results of the rotational position detector 44. In control carried out in the startup mode K, the rotational speed of the rotor 40 is increased until a rotational state is obtained that allows control in the later-described normal mode U.

Thus, the rotational speed of the rotor 40 gradually increases with repeated execution of control in the startup mode K stipulated in step S51. When the rotational speed R of the rotor 40 has increased to exceed the reference rotational speed $R_0$, it is determined that the rotational speed R is greater than the reference rotational speed $R_0$ in step S50, and the process proceeds to step S52. After the process has proceeded from step S50 to S52, the CPU 45b reads the normal mode U stored in the memory 45a, and controls the application of electric power to the stator coil 22 using feedback control, i.e., control of application of electric power to the stator coil 22 while the detection signal (the rotational speed of the rotor 40) sent from the rotational position detector 44 is used as feedback. Specifically, the rotational speed (command speed) corresponding to the rotation signal sent from the external controller 100 and the rotational speed (actual speed) of the rotor 40 corresponding to the detection signal sent from the rotational position detector 44 are compared, and the application of electric power to the stator coil 22 is controlled such that the real speed conforms to the command speed.

When the rotor 40 is rotatably driven in the direction corresponding to the control for application of electric power and the drive shaft 42 is rotatably driven by control for application of electric power on the basis of the normal mode U, the gears 50, 60 are rotated while meshing together to cause negative pressure to operate in the intake chamber 84, the lubricant stored in the tank passes through the intake port 91 under the negative pressure, and is drawn into the intake chamber 84. The drawn-in lubricant penetrates and is retained in the tooth space of the gears 50, 60, in this state, the lubricant is then sent to the discharge chamber 85 by the rotation of the gears 50, 60. Thus, the lubricant sent from the intake chamber 84 to the discharge chamber 85 passes through the discharge port 92 from the discharge chamber 85, is discharged to the lubricant path formed in the engine to lubricate various engine parts, and is thereafter returned to the tank.

Thus, the oil pump 3 can be rotatably driven in accordance with the control for application of electric power of the startup mode K and the normal mode U when the temperature of the lubricant is at or greater than the reference temperature $T_L$, and the viscosity of the lubricant is low enough to not compromise the rotational driving of the oil pump 3. However, in the particular case of use in a low-temperature environment, it may be difficult to cause the oil pump 3 to be rotatably driven in accordance with the control for application of electric power of the startup mode K and the normal mode U when the drive resistance is greater than the drive force of the electric motor 2 caused by the viscosity of the lubricant due to the temperature of the lubricant being less than the reference temperature $T_L$.

Drive control of the electric oil pump 1 by the drive control device 5 in such a case will be described with reference again to the flowchart shown in FIG. 5. The case in which the temperature of the lubricant is at or greater than the reference temperature $T_L$ and the viscosity of the lubricant is low enough to not compromise the rotational driving of the oil pump 3 will not be re-described; mainly the characteristic drive control will be described.

After the process has proceeded from step S10 to step S20, the internal controller 45 stores the detection temperature T (temperature of the main motor case 11) and the process proceeds to step S30, but the detection temperature T stored at this time reflects the ambient temperature and is a temperature (detection temperature T<reference temperature $T_L$) that is less than the reference temperature $T_L$. Consequently, in this state, the drive resistance due to lubricant viscosity is greater than the drive force of the electric motor 2 even when the application of electric power is controlled using the startup mode K and/or the normal mode U, and the oil pump 3 is difficult to rotatably drive.

When such a detection temperature T has been stored, in order for the viscosity of the lubricant to be reduced to a level that does not compromise the rotatably driving of the electric motor 2 by increasing the temperature of the lubricant, the process proceeds from step S30 to step S31 before the application of electric power is controlled using the startup mode K and/or the normal mode U. After the process has proceeded to step S31, the CPU 45*b* reads the heat generation mode H stored in the memory 45*a*, and the application of electric power to the stator coil 22 is controlled using open control, that is to say, the application of electric power to the stator coil 22 is controlled without feedback of the detection signal sent from the rotational position detector 44. For example, application of electric power is controlled so that the electromagnetic force for causing the rotor 40 to rotate is generated in three of the six stator coils 22, and simultaneously, the application of electric power to the remaining three is controlled so that an electromagnetic force that prevents rotation of the rotor 40 is generated, and electric power is applied to the stator coil 22 so that the rotor 40 is not caused to rotate. Controlling the application of electric power in this manner makes it possible efficiently heat the stator coil 22 commensurately with respect to the non-rotation of the rotor 40.

The control for application of electric power based on the heat generation mode H will be described here. First, the impedance Z of the electric motor 2 is represented by the following formula (1), where R is the resistance of the stator coil 22, L is inductance, and f is the frequency of the voltage to be applied.

$$Z = R + j(2\pi f L) \quad (1)$$

The root-mean-square value $I_{RMS}$ of the electric current that flows to the stator coil 22 is represented by formula (2) below, where $V_{RMS}$ is the root-mean-square value of the voltage to be applied to the stator coil 22.

$$I_{RMS} = \frac{V_{RMS}}{|Z|} \quad (2)$$

The effective electric power (amount of heat) P is represented by the following formula (3) using the root-mean-square value $I_{RMS}$ of the electric current indicated in formula (2).

$$P = I_{RMS}^2 R = \left(\frac{V_{RMS}}{|Z|}\right)^2 R \quad (3)$$

It is apparent from formula (3) that reducing |Z| makes it possible to increase the effective electric power P in accordance therewith. i.e., to increase the amount of heat generated by the stator coil 22. From formula (1), |Z| is represented in the following formula (4).

$$|Z| = \sqrt{R^2 + (2\pi f L)^2} \quad (4)$$

With reference to formula (4), R is the resistance of the stator coil 22 and is constant, and it is therefore apparent that |Z| can be made smaller by reducing $2\pi f$, i.e., the frequency f, and the effective electric power P (amount of heat generated by the stator coil 22) can be increased in accordance therewith.

On the other hand, the relationship between $I_{Max}$ and the maximum value of the root-mean-square value $I_{RMS}$ is represented by the following formula (5), where $I_{Max}$ is the maximum electric current that can be allowed to flow to the electric motor 2 and the control board (the board on which the internal controller 45 is mounted).

$$\frac{I_{Max}}{\sqrt{2}} > I_{RMS} \quad (5)$$

From formulas (2) and (5), the application of electric power with a reduced frequency f is controlled in a range in which the following formula (6) holds true, thereby making it possible to efficiently heat the stator coil 22.

$$\frac{I_{Max}}{\sqrt{2}} > \frac{V_{RMS}}{|Z|} \quad (6)$$

Formula (7) below is obtained by modifying formula (6), and formula (7) is represented as shown in formula (8) using formula (4) from above. Also, formula (9) below is obtained by modifying formula (8). Inasmuch, application of voltage is controlled in the heat generation mode H so as to obtain the minimum frequency f that satisfies formula (9), and the stator coil 22 is heated with higher heating efficiency than during control of the application of electric power in the startup mode K and the normal mode U.

$$|Z|^2 > \frac{2V_{RMS}^2}{I_{Max}^2} \quad (7)$$

$$R^2 + (2\pi f L)^2 > \frac{2V_{RMS}^2}{I_{Max}^2} \quad (8)$$

$$f > \frac{\sqrt{\frac{2V_{RMS}^2}{I_{Max}^2} - R^2}}{2\pi L} \quad (9)$$

The process proceeds from step S30 to step S31, and control for application f electric power based on the heat generation mode H is repeatedly executed until the detection temperature T exceeds the reference temperature $T_L$, and the stator coil 22 generate heats. The heat generated by the stator coil 22 is transmitted to the lubricant in the rotor housing chamber 31 via the partitioning case 30 and increases the temperature of the lubricant. In this case, since the thermal capacity of the main motor case 11 is less than the thermal capacity of the lubricant, the temperature of the main motor case 11 essentially equals the temperature of the lubricant, i.e., the temperature of the lubricant increases, and in accompaniment therewith, the temperature of the main motor case 11 also increases. For this reason, detecting the temperature increase of the main motor case 11 using the temperature detector 46 makes it possible to detect an increase in the temperature of the lubricant. Consequently, the internal controller 45 can detect an increase in the temperature of the lubricant on the basis of the detection results sent from the temperature detector 46, and when it has been detected that the detection temperature T has exceeded the reference temperature $T_L$, the process proceeds from step S30 to step S40. Thereafter, the startup mode K is executed until the rotational speed R of the rotor 40 exceeds the reference rotational speed R (step S51), after which a switch is made to the normal mode U to carry out drive control (step S52). As long as the partitioning case 30 is formed using material with good thermal conductivity, the heat generated by the stator coil 22 can be efficiently transmitted to the lubricant in the rotor housing chamber 31, and efficiency for increase the temperature of the lubricant can be enhanced.

Thus, after the application of electric power has been controlled in the heat generation mode H and the temperature of the lubricant has been increased, the stator coil 22 is heated by also controlling the application of electric power in the startup mode K and the normal mode U; therefore, the temperature of the lubricant can be kept at relatively high level. As described above, the electric oil pump 1 controls the application of electric power so as to cause the stator coil 22, which is a constituent element, to efficiently generate heat on the basis of the heat generation mode H, and cause the viscosity of the lubricant to be reduced by increasing the temperature of the lubricant. For this reason, startup can be reliably carried out even when the lubricant viscosity-induced drive resistance is greater than the drive force of the electric motor 2.

Figure 6:
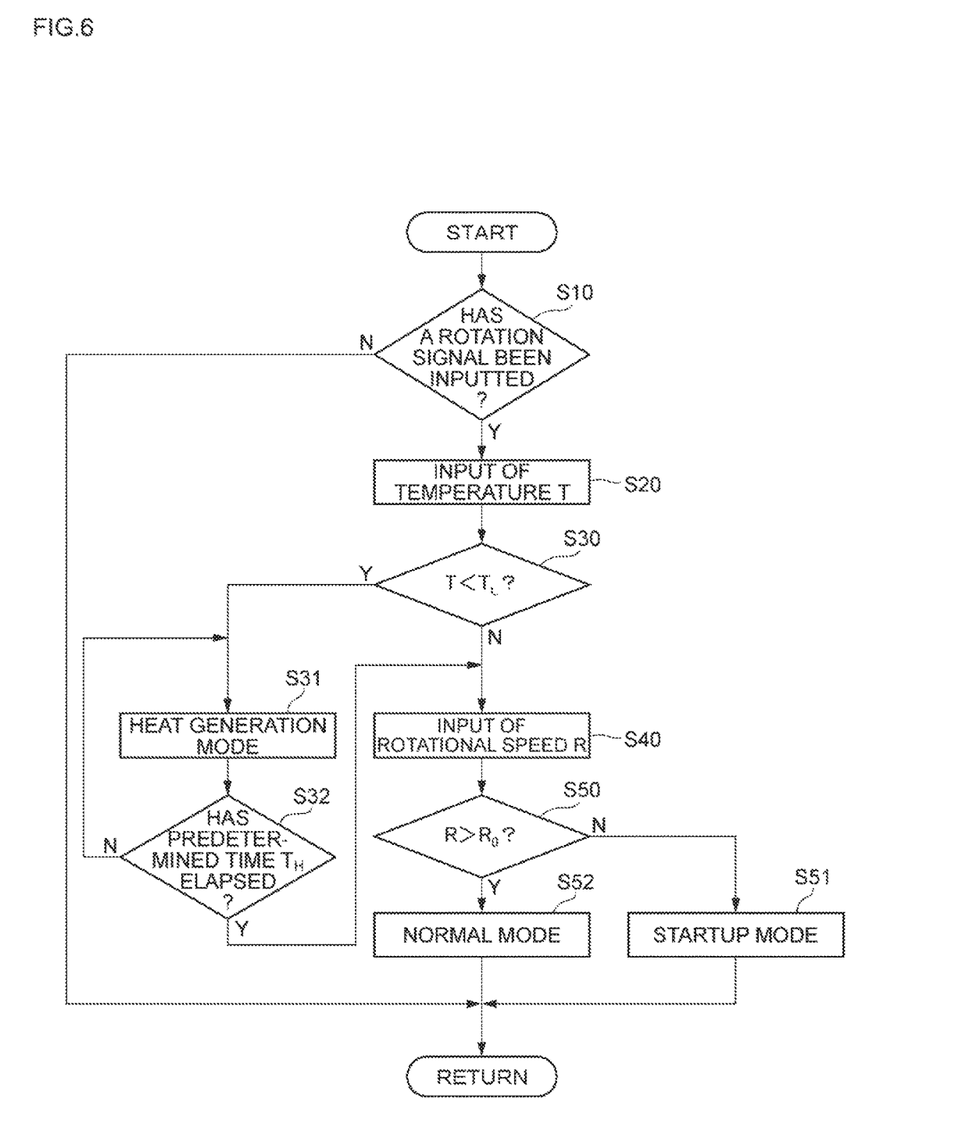
FIG. 6 is a flowchart showing the drive control according to a modification carried out by the drive control device.

Described in the embodiment above is the case in which, when the detection temperature T is less than the reference temperature $T_L$, drive control for repeatedly executing the heat generation mode H until the detection temperature T exceeds the reference temperature $T_L$, as shown in FIG. 5, but in lieu thereof, it is also possible to use the drive control shown in the flowchart of FIG. 6. The flowchart shown in FIG. 6 will be described with focus on the portions that are different from the flowchart shown in FIG. 5. The same numbers are used for the steps showing the same content as the steps shown in FIG. 5.

In the flowchart shown in FIG. 6, when it has been determined that the detection temperature T is less than the reference temperature $T_L$ in step S30 and the process has proceeded to step S31, the heat generation mode H is executed and the process proceeds to step S32. At this point, a predetermined time $T_H$ has been stored in the memory 45a, and in step S32, the CPU 45b reads the predetermined time $T_H$ and compares it with the cumulative execution time of the heat generation mode H in step S31. The predetermined time $T_H$ is the time in which the temperature of lubricant can be reliably increased to exceed the reference temperature $T_L$ by repeatedly executing the heat generation mode H, and is set in accordance with the temperature of the lubricant obtained by empirical measurement. In other words, the predetermined time $T_H$ is set in accordance with the temperature of the lubricant so as to increase in length correspondingly with respect to a decrease in the value of the temperature of the lubricant. For this reason, when the process has proceed from step S30 to step S31, the heat generation mode H is repeatedly executed until the predetermined time $T_H$ corresponding to the detection temperature T has elapsed, and the temperature of the lubricant can be reliably increased until the reference temperature $T_L$ is exceeded.

In the embodiment described above (FIGS. 5 and 6), an example was described in which the temperature of the main motor case 11 is detected by the temperature detector 46 to thereby detect the temperature of the lubricant, and control for driving the electric motor 2 is carried out on the basis of the detection results, but in lieu of this configuration, the temperature of the lubricant in the rotor housing chamber 31 may be directly detected using the temperature detector 46 to control driving.

Figure 7:
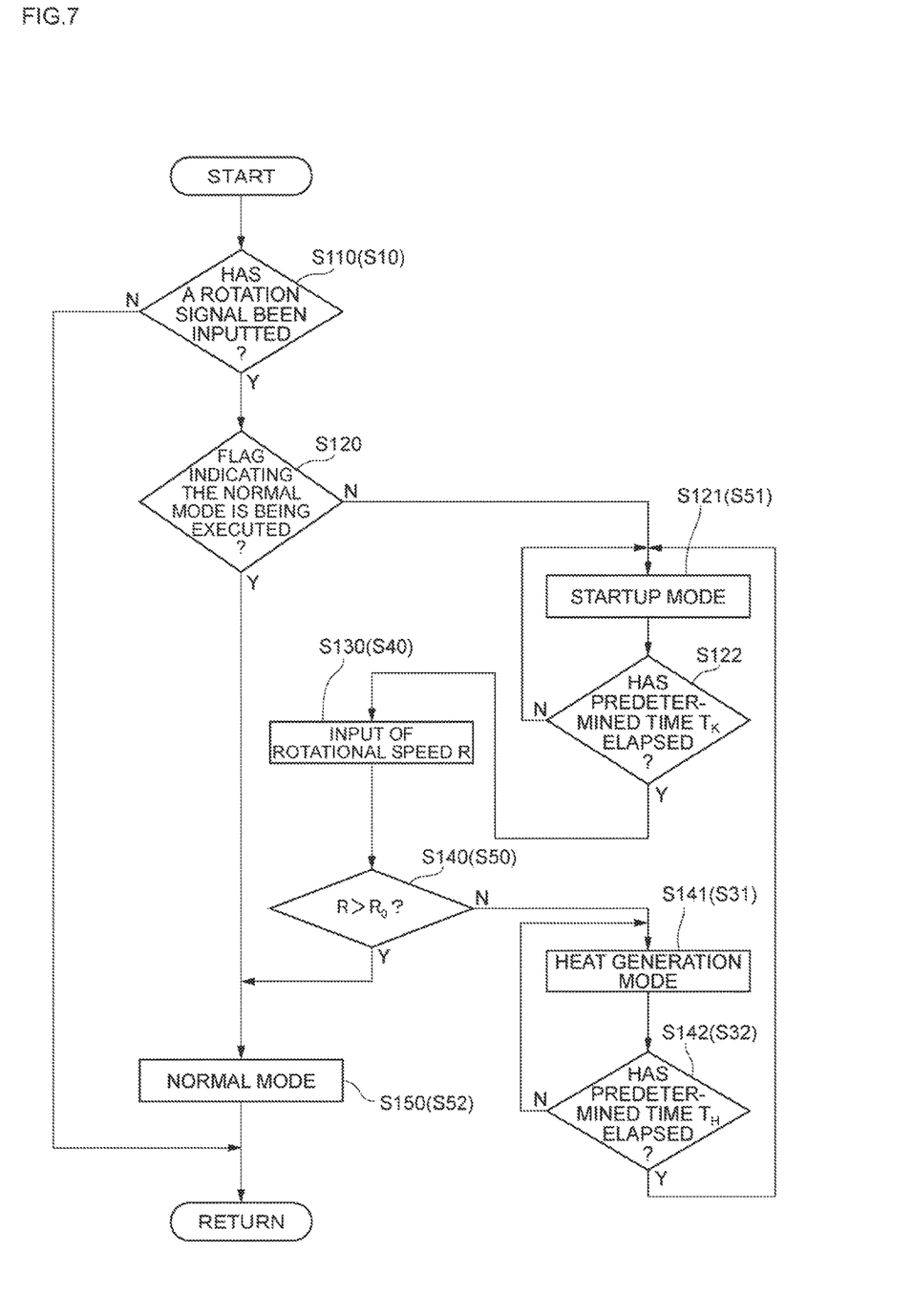
FIG. 7 is a flowchart showing the drive control according to a modification carried out by the drive control device.

In the embodiment described above, drive control was described to be carried out on the basis of a detection signal sent from the temperature detector 46, as shown in FIGS. 5 and 6, but drive may also be controlled without the use of the temperature detector 46, as shown in FIG. 7, for example. The drive control shown in FIG. 7 is described below. The steps showing the same content as the steps shown in FIG. 5 are shown with the corresponding numbers of FIG. 5 in parentheses. A duplicative description of FIGS. 5 and 6 is omitted, and a description will be provided with focus on the portions that differ from FIGS. 5 and 6.

In the drive control shown in FIG. 7, the normal mode U is executed in step S150 and a flag is set to indicate that the normal mode is being executed, and the flag indicating that the normal mode is being executed is maintained until it has been determined that there is no input of a rotation signal from the external controller 100 in step S110. It is determined in step S120 whether the flag indicating the normal mode is being executed has been set, and since the flag indicating the normal mode is being executed has not been set when the flow is initially executed, the process proceeds to step S121, and the startup mode K is executed. At this point, a predetermined time $T_K$ has been stored in the memory 45a, and in step S122, the CPU 45b reads the predetermined time $T_K$ and compares it with the cumulative execution time of the startup mode K in step S121. The predetermined time $T_K$ is the time in which the rotor 40 can be caused to rotate at a higher speed than the reference rotational speed $R_0$ by repeatedly executing the startup mode K when the temperature of the lubricant is at a predetermined temperature or higher than the reference temperature $T_L$, and is set by empirical measurement.

For this reason, when the temperature of the lubricant is higher than the reference temperature $T_L$, the rotor 40 can be caused to rotate at a higher speed than the reference rotational speed $R_0$ by repeatedly executing the step S121 (startup mode K) for the predetermined time $T_K$. In this case, step S121 is repeatedly executed for the predetermined time $T_K$, after which the process proceeds from step S130 to step S140, and it is determined that the rotational speed R is greater than the reference rotational speed $R_0$, whereupon the process proceeds to step S150 (normal mode U).

On the other hand, when the temperature of the lubricant is lower than the reference temperature $T_L$, the lubricant viscosity-induced drive resistance is high, and even if step S121 is repeatedly executed for the predetermined time $T_K$, a rotational speed R that exceeds the reference rotational speed $R_0$ cannot be detected. In this case, step S121 is repeatedly executed for the predetermined time $T_K$, after which the process proceeds from step S130 to step S140 and it is determined with the rotational speed R is less than the reference rotational speed $R_0$. In this case, it is determined that the rotational speed R is less than the reference rotational speed $R_0$, and the process therefore proceeds to step S141 (heat generation mode H). When the process proceeds to step S141, the heat generation mode H is repeatedly executed until it is determined that the predetermined time $T_H$ has elapsed in step S142, the process thereafter returns to step S121, and the startup mode K is repeatedly executed until the predetermined time $T_K$ elapses again.

In step S142, the temperature detector 46 is not used; therefore, the predetermined time $T_H$ corresponding to the temperature of the lubricant is not set. If the predetermined time $T_H$ is insufficient, i.e., when the temperature increase of the lubricant is insufficient, there is no problem in that the process returns to step S121 and executes the startup mode K, and the step S141 is executed again. The temperature of the lubricant is increased by repeatedly executing the heat generation mode H in this manner, and the rotational speed R (in this case, the rotational speed R of when the startup mode K has been executed) of the rotor 40 as detected in step S130 is increased. When the rotational speed R has exceeded the reference rotational speed $R_0$, a detection signal corresponding to the rotational speed R is received and it is determined that rotational speed R is greater than the reference rotational speed $R_0$ in step S140. The process therefore proceeds to step S150 (normal mode U).

When the process proceeds to step S150, control for application of electric power based on the normal mode U is executed and the flag indicating the normal mode is being executed is set. For this reason, when the process has thereafter returned to step S110 and then proceeded to step S120, it is determined that the flag indicating the normal mode is being executed has been set. The process therefore proceeds to step S150 and the normal mode U is executed.

In the above-described embodiment, an example of a configuration was described in which control for the application of voltage was controlled so as to obtain the minimum frequency f that satisfies formula (9) when control of the application of electric power is carried out using the heat generation mode H in the stator coil 22 of an AC electric motor 2, but the present invention is not limited to this configuration. For example, it is also possible to use a DC electric motor in lieu of the AC electric motor 2, and control the application of electric power so that a supplied electric current that is greater than the supplied electric current in the normal mode U is allowed to flow when the application of electric power to the stator coil of the DC electric motor is controlled using the heat generation mode H, and the stator coil is caused to generate heat with higher heating efficiency than in the normal mode U.

In the above-described embodiment, the heat generation mode H for efficiently heating the stator coil 22 using open control was described, but in lieu of open control, it is also possible to control the application of electric power to the stator coil 22 using feedback control such that the rotor 40 is not caused to rotate and the stator coil 22 is efficiently heated. For example, the application of electric power is controlled to cause the repulsion and attraction forces generated between the electromagnetic force generated in the stator coil 22 and the magnetic force in the permanent magnet 43 to act so that rotation of the rotor 40 is prevented.

In the above-described embodiment, an example was described in which the present invention was applied to the electric oil pump 1 configured using an oil pump 3 composed of an externally meshing gear pump, but the present invention can also be applied to an electric oil pump configured using an oil pump of another mode. Other examples to which the present invention can be applied include: a trochoid pump provided with an outer rotor in which a sliding surface is formed on the internal peripheral side, and an inner rotor in which a sliding surface is formed on the external peripheral side; a vane pump in which a vane is protrudably provided to a rotor; and an electric oil pump provided with a centrifugal pump configured using an impeller.

In the above-described embodiment, an example of a configuration was described in which four permanent magnets 43 are mounted on the external periphery of the rotor core 41, and six stator cores 21 are provided, but the number of permanent magnets 43 and stator cores 21 is not limited thereto. It is typical for, for example, 2n (n being a natural number) permanent magnets 43 are mounted on the external periphery of the rotor core 41, and 3n stator cores 21 are provided (n=2 is used as an example in the present embodiment).

In the above-described embodiment, an electric of pump 1 that discharges lubricant to the lubricant path of a engine was described as an example, but the electric oil pump 1 may also be sued in other applications; e.g., supplying cooling oil, supplying oil pressure, and supplying cooling water.

In the above-described embodiment, an example was described in which the present invention was applied to an electric oil pump 1 configured using an electric motor 2 (synchronous motor), but the present invention can also be applied to an electric oil pump configured using an induction motor.

EXPLANATION OF NUMERALS AND CHARACTERS

1: electric oil pump (electric pump)
2: electric motor
3: oil pump (liquid pump)
10: motor casing (motor case)
12: motor housing chamber (case internal space)
20: stator
22: stator coil
30: partitioning case (partitioning member)
40: rotor
42: drive shaft (motor drive shaft)
43: permanent magnet
44: rotational position detector (rotational speed detector)
45: internal controller (electric power application control means;
46: temperature detector
H: heat generation mode (heat generation control mode)
K: startup mode (startup control mode)
$R_0$: reference rotational speed (predetermined rotational speed)
$T_L$: reference temperature (predetermined temperature)
U: normal mode (normal control mode)

The invention claimed is:
1. An electric pump comprising an integral combination of a brushless electric motor and a liquid pump rotatably driven by the electric motor, wherein the electric motor comprises a motor case, a motor drive shaft that is arranged in a case internal space formed inside the motor case and that is rotatably supported by the motor case, a rotor disposed on the motor drive shaft, and a stator that is positioned inside the case internal space so as to surround and oppose the rotor from the outward circumferential direction and that is mounted on the motor case;

electric power application control means is provided for controlling application of electric power to the stator and performing control for rotatably driving the motor drive shaft via the rotor; and the electric power application control means is provided with:
- a normal control mode for controlling application of electric power to the stator such that the motor drive shaft rotates in accordance with an externally inputted rotation command; and
- a heat generation control mode for controlling application of electric power to the stator such that the stator generates heat at a higher heating efficiency than the heating efficiency of the stator when the application of electric power is controlled in the normal mode, wherein the rotor is provided with a permanent magnet on a surface opposing the stator;

the stator is provided with a stator coil;

the electric power application control means is configured so as to control application of electric power to the stator coil; and the heat generation control mode is a mode for controlling the application of electric power to the stator coil so that substantially the lowest voltage frequency f among the voltage frequencies f satisfying the formula $$f > \frac{\sqrt{\frac{2V_{RMS}^2}{I_{Max}^2} - R^2}}{2\pi L}$$

is assumed, where R is the resistance of the stator coil, L is the inductance of the stator coil, f is the frequency of the voltage applied to the stator coil, VRMS is the root-mean-square value of the voltage applied to the stator coil, and IMAX is the maximum current that can flow to the stator coil, and wherein being provided with a temperature detector for detecting the temperature of a liquid fed from the liquid pump by the liquid pump being rotatably driven;

the electric power application control means controlling application of electric power to the stator using the heat generation mode when the temperature of the liquid detected by the temperature detector is lower than a predetermined temperature.

2. An electric pump comprising an integral combination of a brushless electric motor and a liquid pump rotatably driven by the electric motor, wherein the electric motor comprises a motor case, a motor drive shaft that is arranged in a case internal space formed inside the motor case and that is rotatably supported by the motor case, a rotor disposed on the motor drive shaft, and a stator that is positioned inside the case internal space so as to surround and oppose the rotor from the outward circumferential direction and that is mounted on the motor case;

electric power application control means is provided for controlling application of electric power to the stator and performing control for rotatably driving the motor drive shaft via the rotor; and the electric power application control means is provided with:
- a normal control mode for controlling application of electric power to the stator such that the motor drive shaft rotates in accordance with an externally inputted rotation command; and
- a heat generation control mode for controlling application of electric power to the stator such that the stator generates heat at a higher heating efficiency than the heating efficiency of the stator when the application of electric power is controlled in the normal mode, wherein being provided with a rotational speed detector for detecting the rotational speed of the electric motor;

the electric power application control means being furthermore provided with a startup control mode for performing control that applies power to the stator in a predetermined power application pattern, and causing the rotor to be placed in a state of rotation that allows power application control using the normal control mode; and the electric power application control means controlling the application of power to the stator using the heat generation control mode when the rotational speed of the rotor as detected by the rotational speed detector is less than a predetermined rotational speed when power application control has been performed using the startup control mode.

3. An electric pump comprising an integral combination of a brushless electric motor and a liquid pump rotatably driven by the electric motor, wherein the electric motor comprises a motor case, a motor drive shaft that is arranged in a case internal space formed inside the motor case and that is rotatably supported by the motor case, a rotor disposed on the motor drive shaft, and a stator that is positioned inside the case internal space so as to surround and oppose the rotor from the outward circumferential direction and that is mounted on the motor case;

electric power application control means is provided for controlling application of electric power to the stator and performing control for rotatably driving the motor drive shaft via the rotor; and the electric power application control means is provided with:
- a normal control mode for controlling application of electric power to the stator such that the motor drive shaft rotates in accordance with an externally inputted rotation command; and
- a heat generation control mode for controlling application of electric power to the stator such that the stator generates heat at a higher heating efficiency than the heating efficiency of the stator when the application of electric power is controlled in the normal mode, wherein the electric motor is provided with a partitioning member that extends through the area in which the rotor and the stator oppose each other, and partitions the case internal space into a rotor-side space in which the motor drive shaft and the rotor are disposed and a stator-side space in which the stator is disposed.

* * * * *